(12) United States Patent
Büttiker

(10) Patent No.: US 9,295,359 B2
(45) Date of Patent: Mar. 29, 2016

(54) COFFEE MACHINE HAVING A BREWING DEVICE AND HAVING A COFFEE POST-HEATER ARRANGED DOWNSTREAM OF THE BREWING DEVICE

(75) Inventor: Philipp Büttiker, Oberbuchsiten (CH)

(73) Assignee: Jura Elektroapparate AG, Niederbuchsiten (CH)

(*) Notice: Subject to any disclaimer, the term of this patent is extended or adjusted under 35 U.S.C. 154(b) by 235 days.

(21) Appl. No.: 13/703,852

(22) PCT Filed: Jun. 15, 2011

(86) PCT No.: PCT/CH2011/000143
§ 371 (c)(1),
(2), (4) Date: Mar. 4, 2013

(87) PCT Pub. No.: WO2011/156929
PCT Pub. Date: Dec. 22, 2011

(65) Prior Publication Data
US 2013/0156913 A1     Jun. 20, 2013

(30) Foreign Application Priority Data

Jun. 15, 2010  (EP) .................................... 10405116

(51) Int. Cl.
  *A47J 31/46*    (2006.01)
  *A47J 31/54*    (2006.01)
  *A47J 31/56*    (2006.01)

(52) U.S. Cl.
  CPC ............... *A47J 31/46* (2013.01); *A47J 31/467* (2013.01); *A47J 31/542* (2013.01); *A47J 31/56* (2013.01)

(58) Field of Classification Search
  CPC ......... A47J 31/467; A47J 31/46; A47J 31/56; A47J 31/542
  USPC ..................................... 99/281, 300; 426/433
  See application file for complete search history.

(56) References Cited

U.S. PATENT DOCUMENTS 5,259,296 A   11/1993  Mikael et al.
5,941,163 A    8/1999  Park et al.
(Continued)

FOREIGN PATENT DOCUMENTS

| DE | 699 11 675 T2 | 4/2004 |
| EP | 0 559 620 A1  | 9/1993 |
| EP | 0 948 926 A1  | 10/1999 |
| EP | 2 196 116 A1  | 6/2010 |

(Continued)

OTHER PUBLICATIONS

International Search Report and Written Opinion for Application No. PCT/CH2011/000143 dated Oct. 24, 2011.
(Continued)

*Primary Examiner* — Jianying Atkisson
(74) *Attorney, Agent, or Firm* — Alston & Bird LLP

(57) ABSTRACT

The coffee machine (100) is used to prepare a brewed coffee beverage and to dispense the brewed coffee beverage through at least one coffee outlet (47) and has a brewing device (10), which comprises a brewing unit (30) having a brewing chamber (36) for accommodating a predefined amount of coffee, a brewing-water supply line (31), which is connected to the brewing unit (30) and which opens into the brewing chamber (36) and which feeds the brewing water into the brewing chamber (36), and a device (20, 23) for introducing the brewing water into the brewing chamber (36). The device (20, 23) for introducing the brewing water is designed to introduce the brewing water into the brewing chamber (36) through the brewing-water supply line (31) under pressure, wherein the brewing chamber (36) has an outlet (37) for the brewed coffee beverage and the brewing device (10) comprises a coffee dispensing line (40), which coffee dispensing line (40) forms a continuous fluid connection for the brewed coffee beverage between the outlet (37) of the brewing chamber (36) and the coffee outlet (47). The brewing device (10) has a coffee post-heater (50) for post-heating the brewed coffee beverage in the coffee dispensing line (40), wherein the coffee post-heater (50) is arranged between the outlet of the brewing chamber and the coffee outlet (47) and is designed as a flow-through heater for heating the brewed coffee beverage while the brewed coffee beverage flows through the coffee dispensing line (40).

13 Claims, 3 Drawing Sheets

(56) References Cited

U.S. PATENT DOCUMENTS

| | | |
|---|---|---|
| 6,701,068 B2 | 3/2004 | Lin |
| 2004/0018009 A1 | 1/2004 | Lin |
| 2005/0066820 A1 | 3/2005 | Lussi |
| 2008/0008461 A1 | 1/2008 | Hu et al. |
| 2008/0264264 A1* | 10/2008 | Morgandi ................. 99/281 |
| 2010/0077927 A1* | 4/2010 | Buttiker ................. 99/290 |
| 2010/0147091 A1 | 6/2010 | Buttiker |
| 2011/0045152 A1* | 2/2011 | Stutz et al. ............. 426/433 |

FOREIGN PATENT DOCUMENTS

| | | |
|---|---|---|
| WO | WO 2004/006739 A1 | 1/2004 |
| WO | WO 2006/006112 A1 | 1/2006 |
| WO | WO 2006/122720 A1 | 11/2006 |

OTHER PUBLICATIONS

International Preliminary Report on Patentability and Written Opinion for Application No. PCT/CH2011/000143, dated Dec. 19, 2012.

* cited by examiner

COFFEE MACHINE HAVING A BREWING DEVICE AND HAVING A COFFEE POST-HEATER ARRANGED DOWNSTREAM OF THE BREWING DEVICE

The invention relates to a coffee machine having a brewing device for preparing and dispensing a brewed coffee beverage having a brewing device and to a method for brewing and dispensing a brewed coffee beverage by means of such a coffee machine.

The invention relates in particular to a brewing device for brewing a coffee beverage having a brewing unit, wherein the brewing unit is connected to a brewing water supply line on the inlet side and to a coffee dispensing line on the outlet side.

A brewing device for coffee, to which hot brewing water is supplied on the inlet side and which dispenses ready brewed coffee at its outlet during the brewing process or after the completion thereof, respectively, is known per se. For the most part, such a brewing device is fed with hot water or brewing water, respectively, which, coming from a water tank, is initially guided through a flow-through water heater with the help of pumps or similar devices, and is heated there. In addition, such brewing devices, in the case of which the brewing water is initially heated completely in a larger brewing water tank and is then fed to the brewing unit, are also known. After the heating process, the brewing water then also passes through a more or less long line path, until the inlet of the brewing device has been reached.

This leads in particular to the problem that the line path, which is located between the brewing water heating device and the inlet of the brewing unit, can encompass different temperatures, depending on the type, time and frequency of preceding brewing processes. It can thus not be predicted, which brewing water temperature is actually available at the inlet of the brewing unit. This is disadvantageous in that a brewing temperature, which is too high, increasingly extracts bitter substances from the coffee, which is to be brewed, for example, whereby the dispensed coffee tastes bitter.

On the other hand, a brewing temperature, which is too low, is likewise undesirable, because the desired aromas are in this case not dissolved from the coffee powder, and the dispensed coffee thus tastes rather bland. Brewing temperatures in the range of from 90 to 95° C. are generally considered to be ideal.

With reference to this known problem, a plurality of solutions are known from the state of the art for further increasing the brewing water temperature on the inlet side at the brewing unit in consideration of the additional line path between the brewing water heating device and the actual brewing unit, if necessary.

A brewing water auxiliary heating device, which is arranged directly upstream of an area, from which the ready heated brewing water is dispensed, is known from U.S. Pat. No. 6,701,068 B2, for example. The actual brewing water main heating device, which obtains cold fresh water on the inlet side, heats it and subsequently feeds it to a line or tube piece on its outlet, which connects it to the brewing water auxiliary heating device, is located in flow direction upstream of said brewing water auxiliary heating device. A possible undesired cool-down of the brewed water prior to the brewing process takes place in particular in this line or tube piece, respectively, and is compensated again by the brewing water auxiliary heating device, so that sufficient hot brewing water is available for brewing.

A similar solution is known from U.S. patent application 2005/0066820 A1, wherein brewing water preheated in a boiler is also guided through a further heating element, which is embodied as flow-through heater, on the way to the inlet of the brewing unit, wherein, in this case, a control of the additional heating element is carried out with the help of a control unit, as required. The heated brewing water is introduced under a pressure into a brewing chamber of the brewing unit, which can automatically be filled with ground coffee, via a brewing water supply line, so that in particular brewed coffee in the form of espresso can be made in the brewing chamber. In the instant case, the brewed coffee is fed to a nozzle for dispensing coffee via a coffee dispensing line, and is dispensed from the coffee machine at that location via an outlet opening of the nozzle, wherein the coffee dispensing line is connected with one of its two ends to an outlet of the brewing chamber and its other end opens into the nozzle, so that the coffee dispensing line forms a continuous fluid connection, which connects the brewing chamber to the outlet opening of the nozzle.

A solution, in the case of which the brewing water temperature is held to be constant by means of regulation with the help of a single brewing water heating device by interconnecting a temperature sensor into the brewing water path between the brewing water heater and the brewing unit, is known from U.S. patent application 2008/0008461 A1. In the case of this solution, which is known from the state of the art, attempts are thus made to hold the brewing water temperature at a constant value at the inlet of the brewing unit by means of regulation.

Finally, an arrangement is known from DE 699 11 675 T2, in the case of which the brewing unit—in this case the brewing unit of a coffee machine for preparing espresso—can be pivoted from an operating position into a rest position. After pivoting into the rest position, a heat-transferring area of the brewing unit rests against a heating element. In the course of the subsequent brewing process, the brewing unit, which was heated in this manner (in the rest position), is pivoted back into its operating position again and can thus compensate a temperature of the supplied brewing water, which might possibly be too low. In the instant case, the heated brewing water is introduced into a brewing chamber of the brewing unit under pressure, so that coffee in the form of espresso, which is brewed in the brewing chamber, can be made, wherein the brewed coffee flows out of the brewing chamber via a tube, and can be dispensed from the coffee machine.

Coffee machines having brewing devices, in the case of which the coffee beverage brewed in the respective brewing device, must be fed to the coffee outlet of the coffee machine via a relatively long coffee dispensing line, face a particular challenge in view of a reproducibility of the taste of brewed coffee beverages. This applies for example to automatic coffee machines, in the case of which the coffee, which is to be brewed in the brewing water, is automatically supplied to a brewing chamber of a brewing unit and is subsequently brewed with pressurized brewing water, so as to prepare espresso, for example. In such coffee machines, the heated brewing water or the respective brewed coffee beverage, respectively, must for the most part be guided in lines across relatively long distances, before the respective brewed coffee beverage can be dispensed by the coffee machine. Relatively large heat losses can thereby appear—distributed across the entire length of the line—, the size of which can furthermore fluctuate highly. A plurality of coffee beverages, which are prepared consecutively, can thus vary highly in view of their temperature and in view of their taste.

The instant invention is based on the object of avoiding the afore-mentioned disadvantages and to specify a coffee machine having a brewing device which is in particular suitable for preparing espresso, by means of which a quality of the dispensed coffee beverage, which is always optimal, can be ensured in a manner, which can be realized easily, yet effectively.

A further object is to be seen in specifying a corresponding method for brewing and dispensing a coffee beverage with a quality, which is always optimal.

In view of the coffee machine, the object on which the invention is based is solved by means of the subject matter of claim 1.

The coffee machine for preparing a brewed coffee beverage and for dispensing the brewed coffee beverage via at least one coffee outlet encompasses a brewing device for preparing the brewed coffee beverage by brewing a predefined amount of coffee in pressurized brewing water, wherein the brewing device comprises a brewing unit having a brewing chamber for accommodating the predefined amount of coffee, a brewing water supply line, which is connected to the brewing unit and which opens into the brewing chamber, for feeding the brewing water into the brewing chamber, and a device for introducing the brewing water into the brewing chamber. The device for introducing the brewing water is thereby designed to introduce the brewing water into the brewing chamber through the brewing water supply line under pressure. The brewing chamber furthermore encompasses an outlet for the brewed coffee beverage, and the brewing device comprises a coffee dispensing line, which forms a continuous fluid connection for the brewed coffee beverage between the outlet of the brewing chamber and the coffee outlet. The coffee dispensing line thereby encompasses a first end, which is connected to the outlet of the brewing chamber, and which comprises an inlet for accommodating the brewed coffee beverage, which inlet is in fluid connection with the outlet of the brewing chamber. The coffee dispensing line furthermore encompasses a second end, which comprises an outlet, which is in fluid connection with the coffee outlet, for dispensing the brewed coffee beverage.

According to the invention, the brewing device encompasses a coffee post-heater for post-heating the respective brewed coffee beverage in the coffee dispensing line, wherein the coffee post-heater is arranged between the outlet of the brewing chamber and the coffee outlet, and is designed as a flow-through heater for heating the brewed coffee beverage while the brewed coffee beverage flows through the coffee dispensing line.

An essential point of the invention is that the coffee post-heater is arranged between the outlet of the brewing chamber and the coffee outlet of the coffee machine, for example on or in the coffee dispensing line, and that the brewed coffee beverage can be heated by means of the coffee post-heater, when it is located in the coffee dispensing line or when it flows through the coffee dispensing line in the direction towards the end area of the coffee dispensing line on the dispensing side, respectively. Through this, the actual brewing process can be carried out in the brewing unit at the optimal brewing temperature, without the danger that the brewed beverage—for example due to a longer break in operation—can cool down to the extent that the taste quality of the brewed beverage is impacted after leaving the brewing unit on the way into a coffee dispensing device.

In fact, the problem has already been identified in the state of the art that a brewing temperature, which is too low, or a highly fluctuating brewing temperature, respectively, can have a negative impact on the quality of the brewed beverage, coffee as a rule, which leaves the brewing unit. However, it has not yet been identified that, after the brewing has taken place and after leaving the brewing unit, the brewed beverage must, as a rule, be fed to a coffee dispensing unit through additional lines, which, in turn, has a negative impact on the quality of the brewed beverage, because there is a risk that the beverage cools down again prior to the dispensing from the coffee dispensing unit.

It must be considered hereby that the temperature of the coffee beverage, which is dispensed at the end of the coffee dispensing unit, finally depends again on the temperature level of these lines, which are located downstream from the brewing unit, or of the coffee dispensing devices. In particular, the taste quality of the brewed coffee is impacted negatively, when the temperature thereof is too low. In the case of coffee, a temperature of the dispensed coffee, e.g., of 80 to 85° C. is aimed at. This (ideal) temperature is often fallen below, in particular when the parts located downstream from the outlet of the brewing unit, thus when the coffee dispensing line and the corresponding coffee dispensing device have cooled down to room temperature, e.g. after a longer break in operation of the coffee machine.

In an advantages embodiment of the coffee machine, provision is made for example to start the coffee post-heater when coffee, which was brewed after a brewing process took place, enters from the brewing unit into the coffee dispensing line. It is ensured in this manner that the post-heater is in operation only when a brewed beverage is to actually be dispensed, which is advantageous, in particular for energy savings reasons. For this purpose, it is advantageous to design the post-heater, if possible, such that, on the one hand, it transfers the heat, which is typically generated by means of a heating element to the coffee dispensing line, well and, on the other hand, in turn encompasses a small mass, so that it can react as dynamically as possible to a restart after a possible brewing pause in terms of a control curve, which is as steep as possible, or a short downtime, respectively.

According to a further embodiment of the instant invention, however, it can quasi also be advantageous to start up the coffee post-heater when the feeding of brewed coffee from the brewing device into the coffee dispensing line has already ended. This possibility can be considered in particular immediately after the end of a brewing process, when residues of the brewed beverage are still located in the coffee dispensing line. In this case, a steam bubble, which has the effect that an overpressure forms in this area of the coffee dispensing line, is to be generated in the coffee dispensing line by means of a start-up of the post-heater, which lasts for a sufficiently long period of time. Through this, the liquid, which is still located in the coffee dispensing line, is expelled in the direction of the coffee dispensing device, whereby an almost complete dispensing of the brewed beverage into the cup can be attained on the one hand and a longer time for an older brewed beverage to stand in the coffee dispensing line is avoided on the other hand. It is then also ensured through this that almost no residues from the preceding brewing process reach into the dispensing device and thus into the cup in a subsequent brewing process. On the one hand, this is desirable, because these brewing residues, in turn can of course also cool down and can thus negatively impact the temperature of the dispensed brewed beverage and, on the other hand,—for example in response to longer breaks in operation—an oxidation or spoiling respectively, of these brewing residues in the coffee dispensing line can be prevented effectively. For this purpose, it can be reasonable to arrange the post-heater immediately adjacent to the end of the brewing unit on the dispensing side, as possible, so that the path of the coffee dispensing line, which is impacted by the operation of the coffee post-heater, and thus the path, which can be emptied effectively by means of steam bubble formation, accounts for a majority of the overall path of the coffee dispensing line between the brewing unit and the dispensing device, as possible.

In a concrete embodiment of the brewing device, provision is made for the post-heater to encompass a tube, wherein a heating element runs adjacent to the tube. This heating element, in turn, encompasses power connections, wherein, after applying an electrical voltage, the used energy is converted into heat and the heating element heats up. The tube is inserted into the liquid path of the coffee dispensing line and encompasses a coffee supply connection as well as a coffee dispensing connection for this purpose, which open into respective opposite ends of the tube. However, it goes without saying that it is also possible to design the post-heater in the form of an externally applied heating element, which is applied to an existing, continuous coffee dispensing line by forming a sufficient heat contact by means of adhesion or fusion, for example.

However, the heated tube, which is inserted into the liquid path of the coffee dispensing line, can also be fixedly connected at least area by area to the heating element, which runs adjacent thereto. It is hereby in turn possible, in particular, to fuse or to adhere the heating element area by area, so as to ensure a good heat contact.

In a further concrete preferred embodiment of the post-heater of the brewing device, provision is made in addition to the tube and to the heating element, which runs adjacent thereto, for a housing, which consists of a material, which conducts heat as well as possible. Aluminium can in particular be considered for this purpose, but further materials, which conduct heat well, are also possible. The housing can thereby in particular be a cast housing, which is embodied by means of recasting of the tube and of the heating element at least area by area. By providing a housing for the post-heater, not only the mechanical stability is improved, but due to the heat-storing and heat-conducting characteristics of the used material, it is ensured in particular that as little heat loss as possible occurs in the course of the heating transfer of the heat element to the tube.

In a further concrete embodiment of the instant invention, provision is made for the heating element, which is designed as an electrical resistance heating to be embodied as a ceramic thick film heater. For this purpose, the heating element is applied to a ceramic substrate, which encompasses a certain thickness and thus a limited heat storage capacity. Due to a relatively small delay in the regulating behaviour of the heating element, an even heat transfer of the heat, which is generated by means of the heating element, to the tube, which runs adjacent thereto, is possible through this. It goes without saying, however, that it is also possible to embody the heating element as a common PTC heating resistor (heating resistor having a positive temperature coefficient). When using a common PTC heating resistor, it can be attained in an advantageous manner in the case of a dimensioning, which is predefined beforehand, that a natural regulation of the heating temperature takes place without additional regulating elements.

Further details of the instant invention will be explained by means of an exemplary embodiment of a coffee machine by means of the enclosed drawings.

Figure 1:
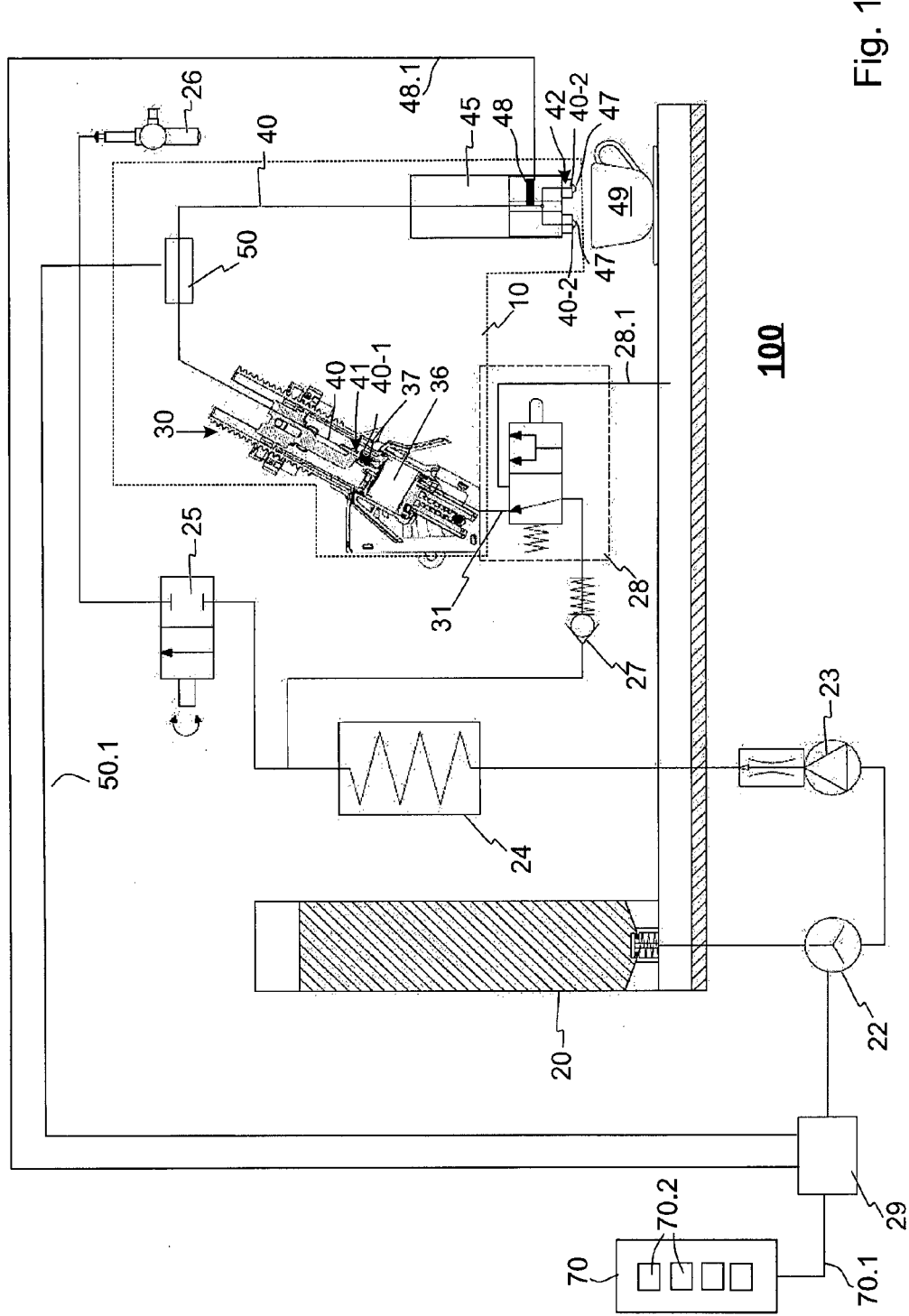
FIG. 1 shows the schematic design of a coffee machine according to the invention having a brewing device, which comprises a brewing unit.

FIG. 1 shows the schematic diagram of a coffee machine 100 according to the invention, having a brewing device 10, wherein the brewing device 10 in the shown exemplary embodiment consists of a brewing unit 30, a coffee post-heater 50 as well as of a coffee dispensing line 40.

The coffee dispensing line 40 connects the brewing unit 30 to a coffee dispensing device 45 and encompasses an end area 41 on the side of the brewing unit, which is connected to the brewing unit 30, as well as an end area 42 on the dispensing side, which is connected to a coffee dispensing device 45. The end area 41 on the end side of the brewing unit adjoins a first end 40-2 of the coffee dispensing device 45, which serves to accommodate a coffee beverage, which is brewed in the brewing unit. In the instant example, the coffee dispensing line 40 is branched in the end area 42 on the dispensing side and encompasses two second ends 40-2, which are located opposite the first end 40-1 and which open into two coffee outlet openings 47, which are arranged next to one another and through which a coffee beverage brewed in the brewing unit 30 can flow out of the coffee dispensing line 40, for example into a beverage vessel 49 arranged below the coffee outlet openings 47. In the shown exemplary embodiment, the coffee post-heater 50 is arranged in the end area 41 on the side of the brewing unit. On the inlet side, the brewing device 10 is connected to a brewing water supply line 31, through which heated brewing water is fed to this brewing unit 30 for the purpose of brewing a coffee beverage in the brewing unit 30.

The brewing water in the brewing water supply line thereby encompasses a temperature, which is suitable for brewing the respective coffee beverage, preferably in the range of between 90° and 95° C. The required brewing water temperature in the brewing water supply line 31 is thereby ensured by heating in a brewing water heater 24. For this purpose, fresh water is fed to the brewing water heater 24 from a water tank 20, wherein in the shown exemplary embodiment, the required water pressure is built up by a pump 23, which is arranged between the water tank 20 and the brewing water heater 24.

Provision is furthermore made for a flow meter 22, which can be arranged in the fresh water path between the water tank 20 and the brewing water heater 24, so as to provide information relating to the amount of heated fresh water, thus brewing water, which is fed to the brewing device. When a positive rate of flow is identified by means of the flow meter 22, a conclusion can be drawn that a brewing process is taking place at the present time, and when a rate of flow is not identified, a conclusion can accordingly be drawn from this information that a brewing process is not taking place. It goes without saying that a similar flow meter can also be arranged between the brewing water heater 24 and the brewing unit 30. It is furthermore possible to additionally or exclusively arrange a similar flow meter in the coffee dispensing line 40. In these cases, it might be necessary to design these similar flow meters for higher liquid temperatures and/or to be accordingly more robust in view of the susceptibility to contamination caused by deposits.

The information that a brewing process is taking place, as well as the information that a brewing process is not taking place or was ended, respectively, can just as well be carried out by means of other measuring devices, for example pressure sensors. This information can furthermore be provided, in particular in response to the integration of the brewing device according to the invention into automatically operating coffee machines, by means of the program sequence control of this automatic coffee machine or of the coffee maker.

According to the described embodiment, a control unit 29 of the coffee machine 100 is connected to the described device for identifying a water supply to the brewing unit 30, that is, to the flow meter 22. The control unit 29 furthermore encompasses a connection 50.1 to the coffee post-heater 50 and is designed to start up or shut down, respectively, the coffee post heater 50 via the connection 50.1. This activation of the coffee post-heater 50 takes place according to a corresponding assessment of the information received from the flow meter 22, that is, according to an assessment, whether or not a brewing process is taking place (water, which flows through, is identified). To obtain information as to whether a brewing process had finished recently as well as for adjusting a possible follow-up time of the coffee post-heater 50, the control unit 29 can furthermore encompass a timer.

A drain valve 27, which releases the flow path of the brewing water in the direction of the brewing unit 30 after the build-up of a corresponding brewing water pressure by means of the pump 23, can be installed into the brewing water supply line 31, that is, into the line path between brewing water heater 24 and brewing unit 30. After finishing a brewing process and thus after turning off the pump 23, the corresponding non-return function of the drain valve 27 then ensures that no brewing water or at best small amounts of brewing water flow back again through the brewing water supply line 31 in the direction of the brewing water heater 24.

Provision can furthermore be made in the brewing water supply line between the drain valve 27 and the brewing unit 30 for a drainage valve unit 28, wherein a connection between the brewing water supply line 31 and a drainage line 28.1 can be established, for example after switching over the drainage valve unit 28 (from the position illustrated in FIG. 1 into another position), so that, for example after the brewing of a coffee beverage, excess brewing water from the brewing unit 30 can in each case be fed to the drainage line 28.1 and can be discharged via the drainage line 28.1 (to a container, which is not illustrated in FIG. 1).

Provision can further be made for a switchover valve 25, which is connected to the outlet of the brewing water heater 24 and which is connected to a frothing device 26 for preparing milk froth.

Figure 2:
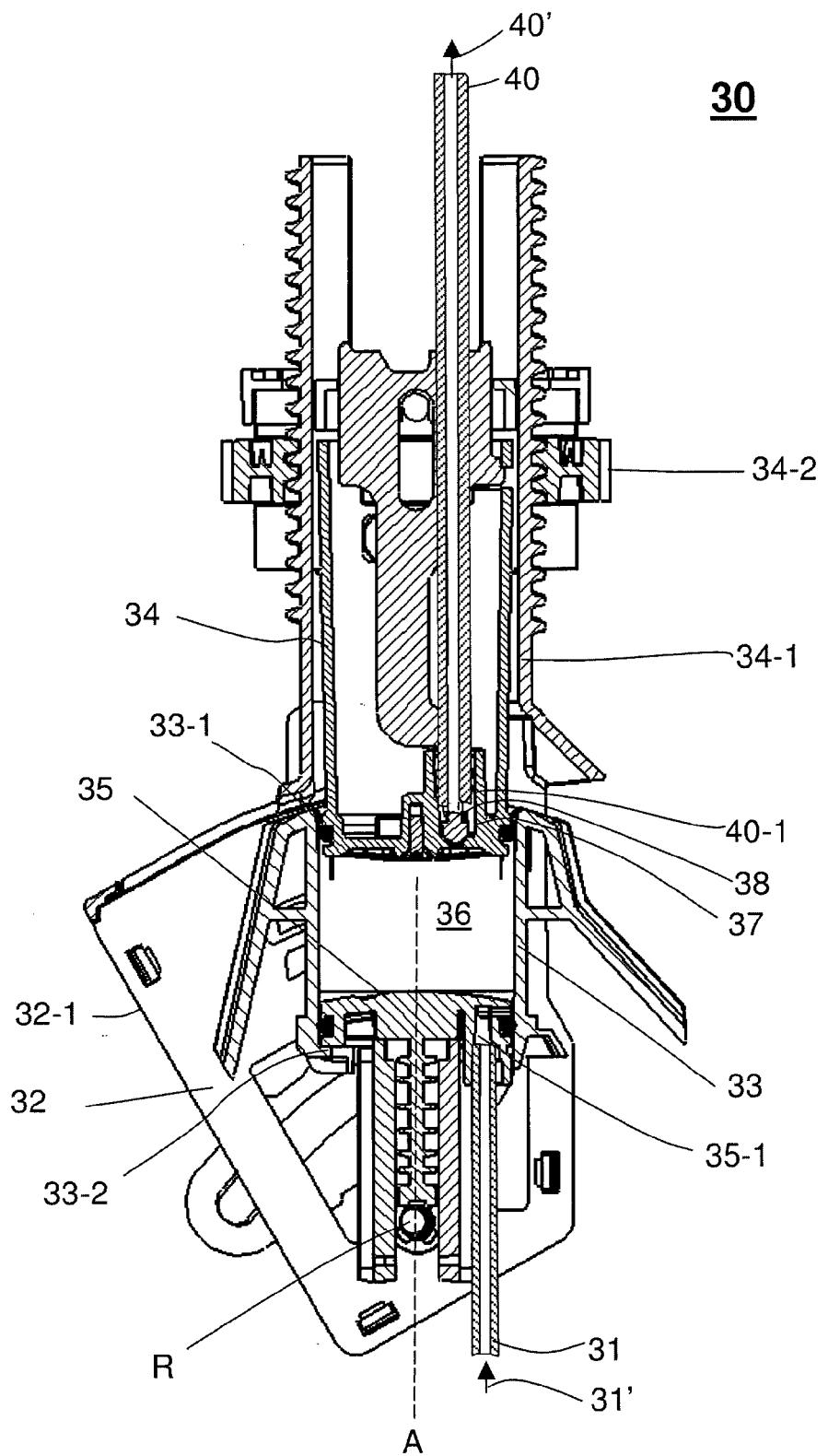
FIG. 2 shows the brewing unit according to FIG. 1 in a longitudinal section.

Details of the brewing unit 30 can be seen from FIG. 2. The brewing unit 30 is designed for the fully-automated preparation of brewed coffee beverages, in particular espresso, and is based on concepts, which are known from EP 0 559 620 or EP 2 196 116, for example, in view of its construction. The brewing unit 30 comprises a number of components, which are fastened to a support structure 32, and which can be mounted into the coffee machine 100 together with the support structure 32 as a whole. The brewing unit 30 in particular comprises a brewing cylinder 33, which is supported on the support structure 32 such that it can be pivoted about an axis of rotation R (oriented vertically to the drawing plane in FIG. 6). It is thus possible to pivot the brewing cylinder 33 (by means of a drive, which is not illustrated in FIG. 2) in two different positions. FIG. 2 shows the brewing cylinder 33 in a position, in which the brewing unit is ready to prepare a brewed coffee beverage. In this position, the brewing cylinder 33 is positioned such that one end of a brewing piston 34, which can be moved linearly in the longitudinal direction of a guide 34-1, which is fastened to the support structure, and along the guide 34-1 by means of a drive 34-2, can be moved into the brewing cylinder 33 along a longitudinal axis A of the brewing cylinder 33 through an opening 33-1 embodied on one end of the brewing cylinder 32, so that this opening 33-1 is closed tightly by means of the brewing piston 34. On an end located opposite the opening 33-1, the brewing cylinder 33 encompasses a second opening 33-2, which is closed tightly by means of a piston 35, which can be moved along the longitudinal axis A of the brewing cylinder 33. During the brewing of coffee, the brewing piston 34 and the piston 35 are positioned relative to the brewing cylinder 34 such that a brewing chamber 36 is embodied in the brewing cylinder 33 between the brewing piston 34 and the piston 36.

To be able to prepare a coffee beverage by means of the brewing unit 30, it must be ensured initially that the brewing chamber 36 is filled with coffee powder. As can be seen from FIG. 2, one end of the brewing water supply line 31 opens into a brewing water duct 35-1, which is embodied in the piston 35 and which is connected to the brewing chamber 36 via a plurality of openings (not illustrated in FIG. 2). Hot brewing water can be guided into the brewing chamber 36 under pressure via the brewing water supply line 31 (as is suggested in FIG. 2 by means of an arrow 31'). As is furthermore suggested in FIG. 2, an outlet 37 of the brewing chamber 36 is integrated into the brewing piston 34. A coffee beverage brewed in the brewing chamber 36 can leave the brewing chamber 36 through the outlet 37. As can be seen in FIG. 2, the end 40-1 of the coffee dispensing line 40 is connected to the outlet 37, so that the brewed coffee beverage can flow into the coffee dispensing line 40 at this end 40-1 and can flow to the coffee outlet openings 47 of the coffee machine 100 (as is suggested in FIG. 2 by means of an arrow 40'). As is further suggested in FIG. 2, a valve 38 is positioned in the outlet 37 of the brewing chamber 36. The valve 38 is designed such that it keeps the outlet 37 of the brewing chamber 36 closed as long as the pressure of the brewing water in the brewing chamber 36 falls below a predefined minimum value, and releases the outlet 37 for dispensing a brewed coffee beverage (e.g. espresso), when the pressure of the brewing water in the brewing chamber 36 exceeds the predefined minimum value.

To fill the brewing chamber 36 with coffee powder prior to the preparation of a coffee beverage or to remove the coffee powder used for brewing the coffee beverage from the brewing cylinder 33 again after the preparation of a coffee beverage, the brewing cylinder 33 can be pivoted against a side edge 32-1 of the support structure 32. For this purpose, the brewing piston 34 must initially be moved along the guide 34-1 by means of the drive 34-2 such that the brewing piston 34 no longer projects into the brewing cylinder 33 and does not close the opening 33-1. In the event that the brewing cylinder 33 is pivoted towards the side edge 32-1 of the support structure 32, the opening 33-1 of the brewing cylinder 33 can be accessed freely, so that brewed coffee powder (with the help of the piston 35) can optionally be removed through the opening 33-1 (for example automatically) or certain coffee powder can be filled into the brewing cylinder 33 (for example automatically) through the opening 33-1 for brewing.

The valve 38 can be designed such that coffee powder can be brewed in the brewing chamber 36 with brewing water under a pressure of 5 Bar or a larger pressure. The pump 23 can accordingly be embodied such that brewing water can be introduced into the brewing chamber with a pressure of 5 Bar or a larger pressure. Under these conditions, the brewing unit 30 provides in particular for the preparation of a brewed coffee beverage in the form of espresso.

The course of a brewing process of a coffee beverage according to the instant invention will be defined in more detail below in an exemplary manner by means of the embodiment shown in FIG. 1.

After starting up the pump 23, fresh water is conveyed from the water tank 20 in the direction of the brewing water heater 24, wherein the amount of water, which passes through, is determined by the flow meter 22 and this information is fed to the control unit 29. The brewing water heater 24 heats the fresh water running through it to the temperature, which is required for brewing the coffee beverage, which as a rule lies between 90 and 95° C. The switchover valve 25 is connected such that no heated brewing water or steam, respectively, is fed to the frothing device 26. The liquid path of the heated brewing water accordingly extends downstream from the brewing water heater 24 in the direction towards the outlet valve 27, which releases the liquid path in the brewing water supply line 31 in the direction of the drainage valve unit 28 by means of the pressure gradient, which builds up. The drainage valve is accordingly switched such that the brewing water, which runs through, is fed to the inlet of the brewing unit 30, which is a part of the brewing device 10.

By means of a corresponding preparation, e.g. by filling the brewing chamber 36 with coffee powder, the brewing unit 30 is in a state, which is ready for brewing, at the beginning of the brewing process. The brewing water, the temperature of which is maintained accordingly, which rests against the inlet of the brewing unit 30, is now used within the brewing unit 30 to prepare the coffee beverage and to dispense it to the outlet 37 of the brewing chamber 36. This feeding of a brewed coffee beverage can be a simple conveying of the brewing water through the coffee powder with a corresponding following filtering. It goes without saying that it is also possible for the preparation of the coffee beverage to take place in a different way in the brewing unit.

The brewed coffee beverage subsequently flows into the coffee dispensing line 40, on which the coffee post-heater 50 is arranged. Due to the duration of the brewing process as well as due to possible heat losses within the brewing unit 30, the ready brewed coffee beverage, which is fed to the coffee post-heater 50, possibly encompasses a temperature, which is lower than the optimal drinking temperature of the coffee beverage. A temperature range of from 80 to 85° C., for example, can be considered to be an optimal drinking temperature.

Once the coffee has been dispensed, the coffee post-heater 50, the design of which will be defined in more detail below, is started up. The coffee post-heater 50 then heats the coffee beverage in the coffee dispensing line 40 to a temperature, which is so high that it is ensured that the coffee beverage, after the dispensing into a beverage vessel, assumes a temperature, which lies in the range of the optimal drinking temperature. The coffee beverage, which is heated to optimal drinking temperature, subsequently flow out of the coffee dispensing line 40 into the coffee dispensing device 45, which serves the purpose of dispensing the coffee as evenly as possible and mostly without splatters via the coffee outlet openings 47 into a beverage vessel 49 located therebelow.

When the brewing process has finished, that is, when it has been determined by means of the flow meter 22 that a sufficient amount of brewing water was fed to the brewing unit 30, the brewing water heater 24 as well as the pump 23 is turned off, and the flow-through through the brewing device 10 is interrupted. By correspondingly evaluation the timer of the control unit 29, it is now possible to allow the coffee post-heater 50 to continue to run for a limited time even after the brewing process has finished, or to start it up once again, respectively. Due to the fact that a further liquid is not fed to the coffee dispensing line 40, the residual liquid located in the coffee dispensing line 40 is thus further heated. Due to the expansion of this residual liquid, possibly also by forming a steam bubble in direct vicinity of the end area 41 of the coffee dispensing line 40 on the side of the brewing unit, this course of action leads to a pressure build-up within the coffee dispensing line 40, whereby residual liquid, in this case thus residues of the coffee beverage, which is currently freshly brewed, are expelled in the direction of the coffee dispensing device 45 and thus into the beverage vessel. It is ensured through this that a residual amount of brewed coffee is prevented for the most part from remaining in the coffee dispensing line 40. On the one hand, this is desirable, so as not to feed any or only a small amount of residual beverage, which remained in the coffee dispensing line and which possibly cooled down, to the coffee dispensing device 45 in response to a possible subsequent brewing process, which would further decrease the beverage temperature. On the other hand, this also makes sense for hygienic reasons, because the risk can thus be avoided that beverage residues located in the coffee dispensing line 40 spoil in response to a longer standing time.

Figure 3:
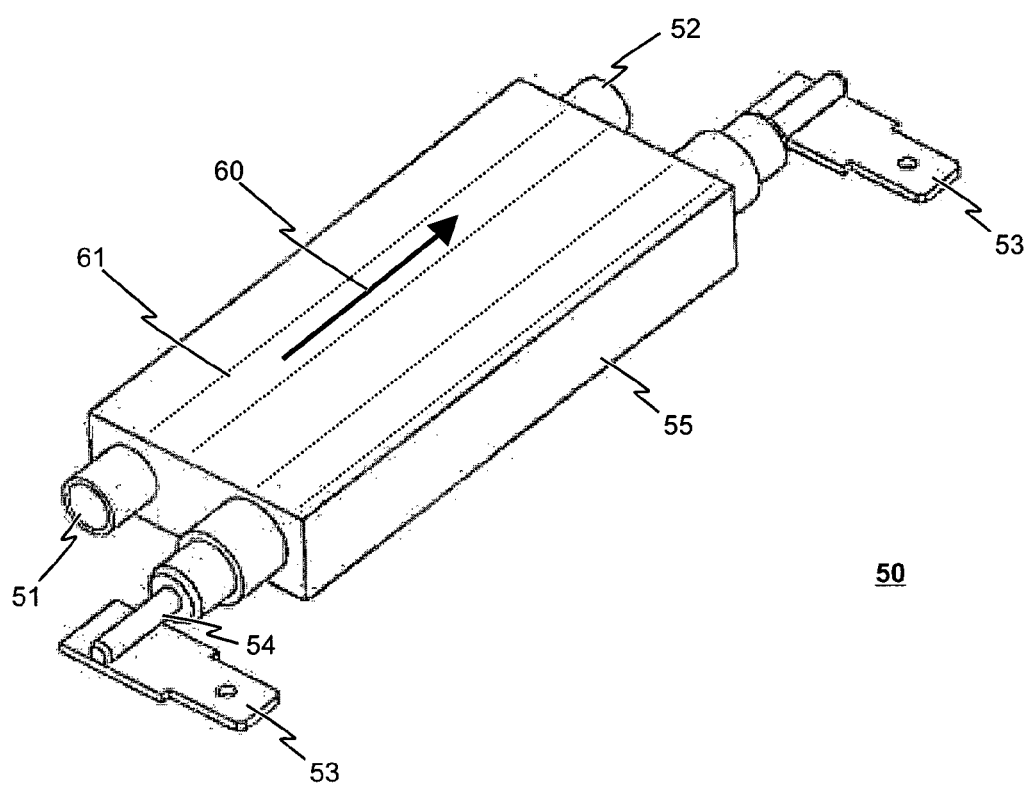
FIG. 3 shows a three-dimensional view of a coffee post-heater, which is used in the coffee machine according to FIG. 1.

FIG. 3 shows a perspective view of a coffee post-heater 50, as it can be used, for example, in connection with the coffee machine 100, which is explained in combination with FIG. 1.

As can be seen in FIG. 3, the coffee post-heater 50 encompasses a housing 55, which preferably consists of a material, which conducts heat as well as possible, for example aluminium. In the event that this housing 55 is produced by means of the casting method, it can in particular be embodied as a massive block, wherein the material, thus the aluminium, surrounds an embedded elongate heating element 54 as well as a tube 61, which runs adjacent thereto.

The tube 61, which permeates the housing 55, represents the flow path of the beverage, which is to be post-heated, wherein the flow direction is suggested by means of an arrow, which is provided with reference numeral 60. The course of the tube 61 in the interior of the housing block 55 is illustrated schematically in FIG. 3 by means of dotted lines, which run parallel to one another.

The tube encompasses a supply connection 51 as well as a dispensing connection 52, wherein the connections serve the purpose of installing the coffee post-heater 50 into a coffee dispensing line 40. The coffee dispensing line 40 can also comprise two tubes, for example, wherein the two tubes are dimensioned such that one end of the one tube can be inserted onto the supply connection 51, and the other end of this one tube forms the end area 41 of the coffee dispensing line 40 on the brewing unit side, and one end of the other tube can be inserted onto the dispensing connection 52, and the other end of this other tube forms the end area 42 of the coffee dispensing line 40 on the dispensing side. In the alternative, the supply connection 51 of the coffee post-heater 50 can also be connected directly to the brewing unit 30 or to the outlet 37 of the brewing chamber 36, respectively, so that the supply connection 51 forms the end area 41 of the coffee dispensing line 40 on the side of the brewing unit.

An electrical resistance heating element 54, the course of which in the interior of the housing 55 is in turn also suggested by means of dotted lines, runs adjacent to the tube 61. For the purpose of power supply, the heating element 54, which is a PTC heating resistor for example, encompasses power connections 53. No further explanation is required that the heating element 54 is possibly provided with an electrical insulation, so as to prevent an unintentional short-circuiting of the current path via a metallic housing.

After applying a corresponding electrical voltage to the power connections 53, the heating element 54 heats up and emits the majority of the heat generated in this manner to the housing 54, which conducts heat well, whereby a heat transfer to the tube 61 takes place in turn. A liquid, which runs through the tube 61, thus coffee according to the invention, which must be post-heated, is thereby also heated.

However, it is also possible not to arrange the tube 61 as well as the heating element 54 in a heat-conducting housing 55, but to arrange the tube 61 and the heating element 54 on a path immediately adjacent to one another, and to connect them by forming a heat-conducting transition, e.g. by fusing or adhesion.

Likewise, the shape of the tube 61 as well as of the heating element 54 and possibly of the housing 55 is also not limited to a substantially straight course. Instead, it is also possible to design such a coffee post-heater 50 in a curved shape, for example so as to be curved in a U-shaped manner.

The tube 61, which in the shown embodiment is almost completely surrounded in flow direction 60 by the material of the housing 55, which conducts heat well, by means of recasting, in turn consists of chromium steel or of aluminium. In the shown case, the heating element 54 is designed as heating resistor, preferably as PTC heating resistor, but can also be designed embodied as ceramic thick film heater, for example. It is ensured in all cases that, when using a coffee machine according to the invention, the beverage, which is to be dispensed, can be brought to a beverage temperature, which lies in the range of the optimum drinking temperature, during the brewing process.

The brewing device 10 can be designed such that the heating element 54 is in each case heated to a predefined temperature when post-heating the respective brewed coffee beverage, wherein the respective current flowing through the heating element 54 is controlled accordingly by the control unit 29. When the coffee beverage passes through the coffee dispensing line 40, the temperature of the respective brewed coffee beverage can change on the way between the coffee post-heater 50 and the respective outlet openings 47, wherein the respective change of the temperature of the coffee beverage is a function of the current temperature of the coffee dispensing line 40 in the area between the coffee post-heater 50 and the respective coffee outlet openings 47. To ensure that the temperature of a coffee beverage, which is dispensed by the coffee dispensing device 45, lies within a predefined limit, the respective current flowing through the heating element 54 can be controlled as a function of the current temperature of the coffee dispensing line 40, for example.

In the instant example, a temperature sensor 48 for providing a measuring value for a temperature of the coffee line 46 is arranged on the end area 42 of the coffee dispensing line 40 on the dispensing side, for example in the vicinity of the coffee outlet openings 47, wherein the coffee post-heater 50 can be controlled by means of the control unit 29 as a function of the respective provided measuring value for the respective temperature of the dispensing line 40. For this purpose, the temperature sensor 48 is connected to the control unit 29 by means of a connection 48.1, which is illustrated in FIG. 1, so that information relating to the respective temperature of the coffee line 46, which is measured by means of the temperature sensor 48, is available to the control unit 29 and that the control unit 29 can control the current flowing through the heating element 54 as a function of the temperature measuring values of the temperature sensor 48.

The temperature sensor 48 can also be positioned at another location on the coffee line 46, for example at an area of the coffee dispensing line 40 between the coffee post-heater 50 and the end area 42 of the coffee dispensing line 40 on the outlet side or on the coffee post-heater 50.

In the alternative, a plurality of temperature sensors can also be arranged on the coffee line 46 (distributed along the coffee line 46) and/or one or a plurality of temperature sensors can be arranged on the coffee dispensing line 40 (for measuring the temperature of the coffee dispensing line 40 at different locations), wherein the respective temperature sensors can be connected to the control unit 29, so that information relating to the temperatures of the coffee dispensing line 40, which are measured by the respective temperature sensors, is available to the control unit 29, and the control unit 29 can control the current flowing through the heating element 54 as a function of the respective temperature measuring values of the respective temperature sensors.

The coffee machine 100 can be designed such that the temperature of a coffee beverage dispensed by the coffee dispensing device can be influenced by a user, wherein the user can chose a setpoint value of the temperature, which a coffee beverage dispensed from the coffee dispensing line 40 encompasses, prior to the preparation of the respective coffee beverage by means of a preselection means. For this purpose, the coffee post-heater 50 can be controllable by means of the control unit 29 as a function of the respective preselected setpoint value. The control unit 29 can in particular control the current flowing through the heating element 54 as a function of the respective preselected setpoint value. The respective preselected setpoint value can furthermore also be capable of being changed within a predefined temperature range by means of the preselection means.

The selection of the respective setpoint value can be carried out by means of conventional means. For example, the coffee machine 100 illustrated in FIG. 1, encompasses a preselection means 70 for preselecting a setpoint value of the temperature of a coffee beverage, which is dispensed from the coffee dispensing line 40, and which is realized as a keypad having a plurality of buttons 70.2. The buttons 70.2 are in each case assigned to different setpoint values of the temperature of a coffee beverage, which is dispensed from the coffee dispensing line 40, for example to different values in a temperature range of between 80° C. and 95° C. By pushing the respective buttons 70.2, the respective setpoint value can accordingly be changed gradually. As is suggested in FIG. 1, the preselection means 70 is connected to the control unit 29 by means of a connection 70.1, so that a setpoint value, which is selected by means of the buttons 70.2, can be transmitted to the control unit 29 and this setpoint value can be considered by the control unit 29 when controlling the coffee post-heater 50 or when controlling the current, which flows through the heating element 54, respectively.

It goes without saying that the preselection means 70 can be replaced with preselection means of a different design, for example with a rotary knob, a slider, a touch-sensitive screen, a numerical keypad for inputting the respective setpoint value or other means, which provide a continuous or gradual change of the setpoint value.

In the context of the instant invention, the coffee post-heater 50 can also be replaced with a flow-through heater of another design, for example with a tube-shaped heating glass element (e.g. in the form of a tube made of glass having integrated heating resistors made of wire) or with an inductively heatable tube.

The invention claimed is:

1. A coffee machine for preparing a brewed coffee beverage and for dispensing the brewed coffee beverage via at least one coffee outlet, which encompasses:
   a brewing device for preparing the brewed coffee beverage by brewing a predefined amount of coffee in pressurized brewing water, said brewing device comprises a brewing unit having a brewing chamber for accommodating the predefined amount of coffee, a brewing water supply line, which is connected to the brewing unit and which opens into the brewing chamber, for feeding the brewing water into the brewing chamber, and a device for introducing the brewing water into the brewing chamber, said device for introducing the brewing water is designed to introduce the brewing water into the brewing chamber under pressure through the brewing water supply line, wherein the brewing chamber encompasses an outlet for the brewed coffee beverage, and the brewing device comprises a coffee dispensing line, said coffee dispensing line forms a continuous fluid connection for the brewed coffee beverage between the outlet of the brewing chamber and the coffee outlet, wherein the coffee dispensing line encompasses a first end, which is connected to the outlet of the brewing chamber, and which comprises an inlet for accommodating the brewed coffee beverage, which is in fluid connection with the outlet of the brewing chamber, and encompasses a second end, which comprises an outlet, which is in fluid connection with the coffee outlet, for dispensing the brewed coffee beverage, wherein the brewing device encompasses a coffee post-heater for post-heating the respective brewed coffee beverage in the coffee dispensing line, wherein the coffee post-heater is arranged between the outlet of the brewing chamber and the coffee outlet, and is designed as a flow-through heater for heating the brewed coffee beverage while the brewed coffee beverage flows through the coffee dispensing line, wherein the brewing device further encompasses at least one of: at least one device for identifying a water supply to the brewing unit or at least one device for identifying a coffee beverage supply into the coffee dispensing line, wherein the brewing device further encompasses a control unit, which is connected to at least one of: the at least one device for identifying a water supply to the brewing unit or the at least one device for identifying a coffee beverage supply into the coffee dispensing line, and wherein the control unit is designed to start up the coffee post-heater when it is identified that water is fed to the brewing unit, or wherein the control unit is designed to start up the coffee post-heater when it is, identified that a coffee beverage is fed to the coffee dispensing line.

2. The coffee machine according to claim 1, wherein the control unit is designed to start up the coffee post-heater when it is identified that the supply of water to the brewing unit or the supply of a coffee beverage into the coffee dispensing line has ended.

3. The coffee machine according to claim 1, comprising a preselection means for preselecting a setpoint value of the temperature of a coffee beverage, which is dispensed from the coffee dispensing line, wherein the respective preselected setpoint value can be changed within a predefined temperature range by means of the preselection means and the coffee post-heater can be controlled by means of the control unit as a function of the respective preselected setpoint value.

4. The coffee machine according to claim 1, having one or a plurality of temperature sensors for providing a measuring value for a temperature of the coffee dispensing line, wherein the coffee post-heater can be controlled by means of the control unit as a function of the respective provided measuring value for the respective temperature of the dispensing line.

5. The coffee machine according to claim 4, wherein at least one of the respective temperature sensors is arranged on an end area of the coffee dispensing line on the dispensing side, or on an area of the coffee dispensing line between the coffee post-heater and the end area of the coffee dispensing line on the dispensing side or on the coffee post-heater.

6. The coffee machine according to claim 1, wherein the coffee post-heater encompasses a coffee supply connection and a coffee dispensing connection as well as a heating element having at least one power connection, and wherein the coffee supply connection and the coffee dispensing connection in each case open into opposite ends of a tube, which runs adjacent to the heating element.

7. The coffee machine according to claim 6, wherein the tube is at least one of fixedly connected, fused, or adhered at least area by area to the heating element, which runs adjacent thereto.

8. The coffee machine according to claim 6, wherein the coffee post-heater further encompasses a housing made of a heat-conducting material, wherein the housing is designed such that the heat-conducting material of the housing surrounds the tube and the heating element at least area by area.

9. The coffee machine according to claim 6, wherein the tube consists of chromium steel or of aluminium.

10. The coffee machine according to claim 6, wherein the heating element is a ceramic thick film heater or a PTC heating resistor.

11. The coffee machine according to claim 1, which encompasses a water tank, a brewing water heater, a pump, a drain valve and a coffee dispensing device, wherein the brewing water supply line of the brewing device is connected to the pump and the end area of the coffee dispensing line on the dispensing side is connected to the coffee dispensing device.

12. A coffee machine for preparing a brewed coffee beverage and for dispensing the brewed coffee beverage via at least one coffee outlet, which encompasses:

a brewing device for preparing the brewed coffee beverage by brewing a predefined amount of coffee in pressurized brewing water, said brewing device comprises a brewing unit having a brewing chamber for accommodating the predefined amount of coffee, a brewing water supply line, which is connected to the brewing unit and which opens into the brewing chamber, for feeding the brewing water into the brewing chamber, and a device for introducing the brewing water into the brewing chamber, said device for introducing the brewing water is designed to introduce the brewing water into the brewing chamber under pressure through the brewing water supply line, wherein the brewing chamber encompasses an outlet for the brewed coffee beverage, and the brewing device comprises a coffee dispensing line, said coffee dispensing line forms a continuous fluid connection for the brewed coffee beverage between the outlet of the brewing chamber and the coffee outlet, wherein the coffee dispensing line encompasses a first end, which is connected to the outlet of the brewing chamber, and which comprises an inlet for accommodating the brewed coffee beverage, which is in fluid connection with the outlet of the brewing chamber, and encompasses a second end, which comprises an outlet, which is in fluid connection with the coffee outlet, for dispensing the brewed coffee beverage, wherein the brewing device encompasses a coffee post-heater for post-heating the respective brewed coffee beverage in the coffee dispensing line, wherein the coffee post-heater is arranged between the outlet of the brewing chamber and the coffee outlet, and is designed as a flow-through heater for heating the brewed coffee beverage while the brewed coffee beverage flows through the coffee dispensing line, wherein the brewing device further encompasses at least one of: at least one device for identifying a water supply to the brewing unit or at least one device for identifying a coffee beverage supply into the coffee dispensing line, and wherein the brewing device further encompasses a control unit, which is connected to at least one of: the at least one device for identifying a water supply to the brewing unit or the at least one device for identifying a coffee beverage supply into the coffee dispensing line, wherein the control unit is designed to start up the coffee post-heater when it is identified that the supply of water to the brewing unit or the supply of a coffee beverage into the coffee dispensing line has ended.

13. The coffee machine according to claim 12, wherein the control unit is designed to start up the coffee post-heater when it is identified that water is fed to the brewing unit, or wherein the control unit is designed to start up the coffee post-heater when it is identified that a coffee beverage is fed to the coffee dispensing line.

\* \* \* \* \*